United States Patent
Kwan et al.

(10) Patent No.: US 10,728,156 B2
(45) Date of Patent: Jul. 28, 2020

(54) SCALABLE, LOW LATENCY, DEEP BUFFERED SWITCH ARCHITECTURE

(71) Applicant: AVAGO TECHNOLOGIES INTERNATIONAL SALES PTE. LIMITED

(72) Inventors: Bruce Hui Kwan, Sunnyvale, CA (US); Puneet Agarwal, Cupertino, CA (US); Mohan Kalkunte, Saratoga, CA (US); Nicholas Kucharewski, III, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 1132 days.

(21) Appl. No.: 14/045,199

(22) Filed: Oct. 3, 2013

(65) Prior Publication Data
US 2014/0241160 A1    Aug. 28, 2014

Related U.S. Application Data (60) Provisional application No. 61/768,265, filed on Feb. 22, 2013.

(51) Int. Cl.
| | | |
|---|---|---|
| *H04L 12/851* | (2013.01) | |
| *H04L 12/835* | (2013.01) | |
| *H04L 12/801* | (2013.01) | |
| *H04L 12/931* | (2013.01) | |
| *H04L 12/933* | (2013.01) | |

(52) U.S. Cl.
CPC ............ *H04L 47/24* (2013.01); *H04L 47/17* (2013.01); *H04L 47/18* (2013.01); *H04L 47/30* (2013.01); *H04L 49/1515* (2013.01); *H04L 49/505* (2013.01)

(58) Field of Classification Search
None
See application file for complete search history.

(56) References Cited

U.S. PATENT DOCUMENTS

| | | | | |
|---|---|---|---|---|
| 7,706,255 | B1 * | 4/2010 | Kondrat | H04L 47/10 370/219 |
| 7,742,412 | B1 * | 6/2010 | Medina | H04L 47/11 370/231 |
| 2003/0016628 | A1 * | 1/2003 | Kadambi | H04L 47/266 370/235 |
| 2003/0099193 | A1 * | 5/2003 | Liu | G01N 33/589 370/229 |
| 2003/0179754 | A1 * | 9/2003 | Shankar | H04L 12/56 370/395.4 |

(Continued)

FOREIGN PATENT DOCUMENTS

| | | | | |
|---|---|---|---|---|
| CA | 2279803 | * | 2/2001 | |
| EP | 0 853 441 | * | 7/1996 | H04Q 11/04 |

*Primary Examiner* — Christopher T Wyllie
(74) *Attorney, Agent, or Firm* — Xsensus LLP (57) ABSTRACT

A switch architecture includes an ingress module, ingress fabric interface module, and a switch fabric. The switch fabric communicates with egress fabric interface modules and egress modules. The architecture implements multiple layers of congestion management. The congestion management may include fast acting link level flow control and more slowly acting end-to-end flow control. The switch architecture simultaneously provides high scalability, with low latency and low frame loss.

18 Claims, 8 Drawing Sheets

(56) References Cited

U.S. PATENT DOCUMENTS

| | | | |
|---|---|---|---|
| 2005/0047334 A1* | 3/2005 | Paul | H04L 12/5601 370/229 |
| 2005/0100011 A1* | 5/2005 | Chiruvolu | H04L 47/10 370/389 |
| 2005/0207436 A1* | 9/2005 | Varma | H04L 1/0083 370/412 |
| 2005/0270974 A1* | 12/2005 | Mayhew | H04L 47/30 370/229 |
| 2006/0023705 A1* | 2/2006 | Zoranovic | H04L 49/30 370/389 |
| 2014/0207850 A1* | 7/2014 | Bestler | H04L 69/164 709/203 |
| 2015/0195209 A1* | 7/2015 | Bottorff | H04L 47/25 370/230 |

* cited by examiner

SCALABLE, LOW LATENCY, DEEP BUFFERED SWITCH ARCHITECTURE

PRIORITY CLAIM

This application claims the benefit of priority to U.S. patent application Ser. No. 61/768,265, filed 22 Feb. 2013, which is incorporated by reference in its entirety.

TECHNICAL FIELD

This disclosure relates to networking. This disclosure also relates to switch architectures for communicating packets from a source to a destination.

BACKGROUND

Rapid advances in electronics and communication technologies, driven by immense customer demand, have resulted in vast interconnected networks of computing devices capable of exchanging immense amounts of data. For example, Local Area Networks (LANs) may connect hundreds or thousands of computing devices in a single network. As time goes by and the demand for data continues to grow, improvements in network devices for data centers will help meet that demand.

DETAILED DESCRIPTION

This disclosure discusses a switch architecture that is suitable for handling the characteristics of modern day communication networks. The switch architecture provides scalability, low latency, and low frame loss in a single architecture. Bandwidth demands continue to increase, with video applications and mobile devices significantly driving up bandwidth demands. Also, there are an increasing number of applications that require low latency network response, including RAM cloud and distributed computing applications. Furthermore, these applications are increasingly sensitive to frame loss. Given the scale of the customer base for networks, even a small amount of frame loss may lead to degradation in application performance, and, ultimately, reduced revenue.

Figure 1:
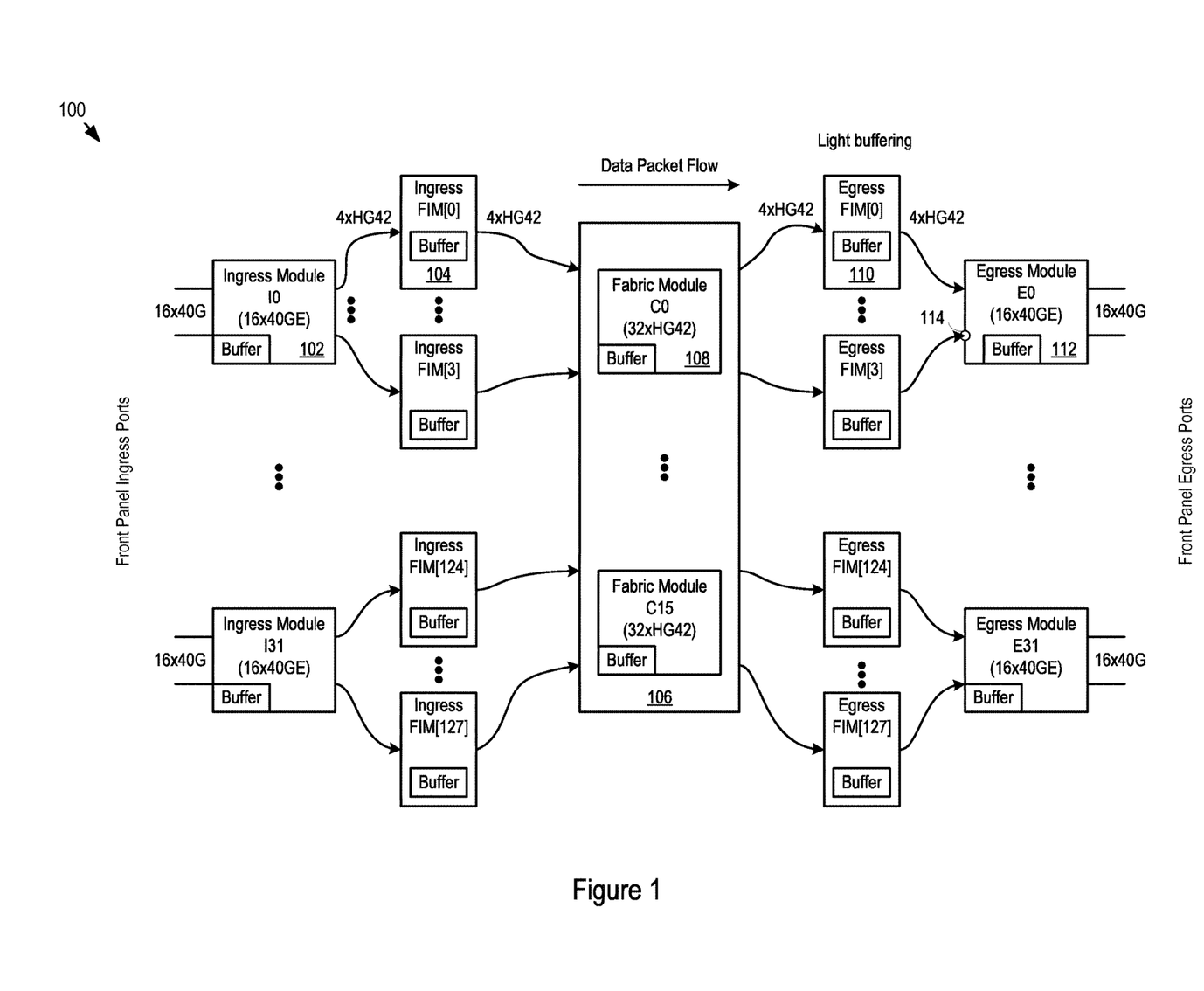
FIG. 1 shows an example switch architecture.

FIG. 1 shows an example overview of a switch architecture 100 ("architecture 100"). The architecture 100 provides high scalability, with low latency and low frame loss. The architecture 100 includes a packet based fabric, and a non-blocking multistage circuit switching network. The network may be implemented as a Clos topology, for example. The architecture 100 also implements layered management that includes fast acting link level (LL) flow control under a less quickly acting end-to-end (EE) flow control. The architecture 100 also includes ingress buffering with Virtual Output Queues (VoQs), and may also include a push model for fabric arbitration. Further, the architecture 100 may include lossless fabric control with Head Of Line (HOL) avoidance.

The architecture 100 may be implemented in many different ways. For example, the architecture 100 includes ingress ports (e.g., front panel ports) through which packets arrive at ingress modules (e.g., the module 102), flow to ingress fabric interface modules (IFIMs) (e.g., the IFIM 104), and then through the switching fabric 106. The switching fabric 106 may include individual fabric modules (e.g., the fabric module 108) and provide full connectivity of any input to any output. Packets move through the switching fabric 106 to the egress FIMs (EFIMs) (e.g., the EFIM 110), and then to the egress modules (e.g., the egress module 112), where they are sent out egress ports (e.g., the front panel ports).

The architecture components, e.g., the ingress modules, IFIMs, fabric modules, EFIMs, and egress modules may be implemented as separate devices. For example, the architecture components may be implemented as separate Application Specific Integrated Circuits (ASICs) or Systems on a Chip (SoCs). In the example in FIG. 2, the architecture includes 32 ingress modules and egress modules, each handling 16 ports, for a total of 512 ports. Also, the IFIMs and EFIMs are configured in this example to handle four links each, and as a result each ingress module communicates through four IFIMs, while each egress module receives traffic from four EFIMs. The switching fabric 106 includes 16 fabric modules, each handling 32 input connections.

The ingress modules may include memory buffers. The IFIMs may include memory buffers as well. In some implementations, the IFIMs include deep buffering in comparison to the buffers provided in the ingress module. The IFIM buffering may be implemented with on-die memory, and in those implementations, the IFIMs do not need an external DRAM interface.

In their buffers, the IFIMs may define Virtual output Queues (VoQs). The VoQs store packets for delivery to egress ports. The VoQs may be organized by Class of Service (CoS) and physical egress port: <physical egress port, CoS>. That is, an IFIM may establish a VoQ for every CoS for every egress port. Accordingly, in an architecture with 512 ports and 10 CoSs, there may be 5120 VoQs established in any given IFIM.

Each fabric module may also include buffering to temporarily hold packets that the switch fabric 106 will route to an EFIM. The EFIMs also include buffering, as do the egress modules. Note, however, that there may be relatively light buffering at the EFIMs and egress modules.

As one example, the ingress modules and egress modules may include buffering on the order of 1 to 5 Maximum Transfer Units (MTUs) for the network it supports. As another example, the deep buffering in the IFIMs may be in an amount exceeding the relatively light buffering, and may be on the order of 20-100 MBytes. The relatively light buffering in the EFIMs and egress modules may be on the order of 1-20 MBytes. These are just examples, and they may scale with the number of input ports, the line rate, and other network characteristics.

Figure 2:
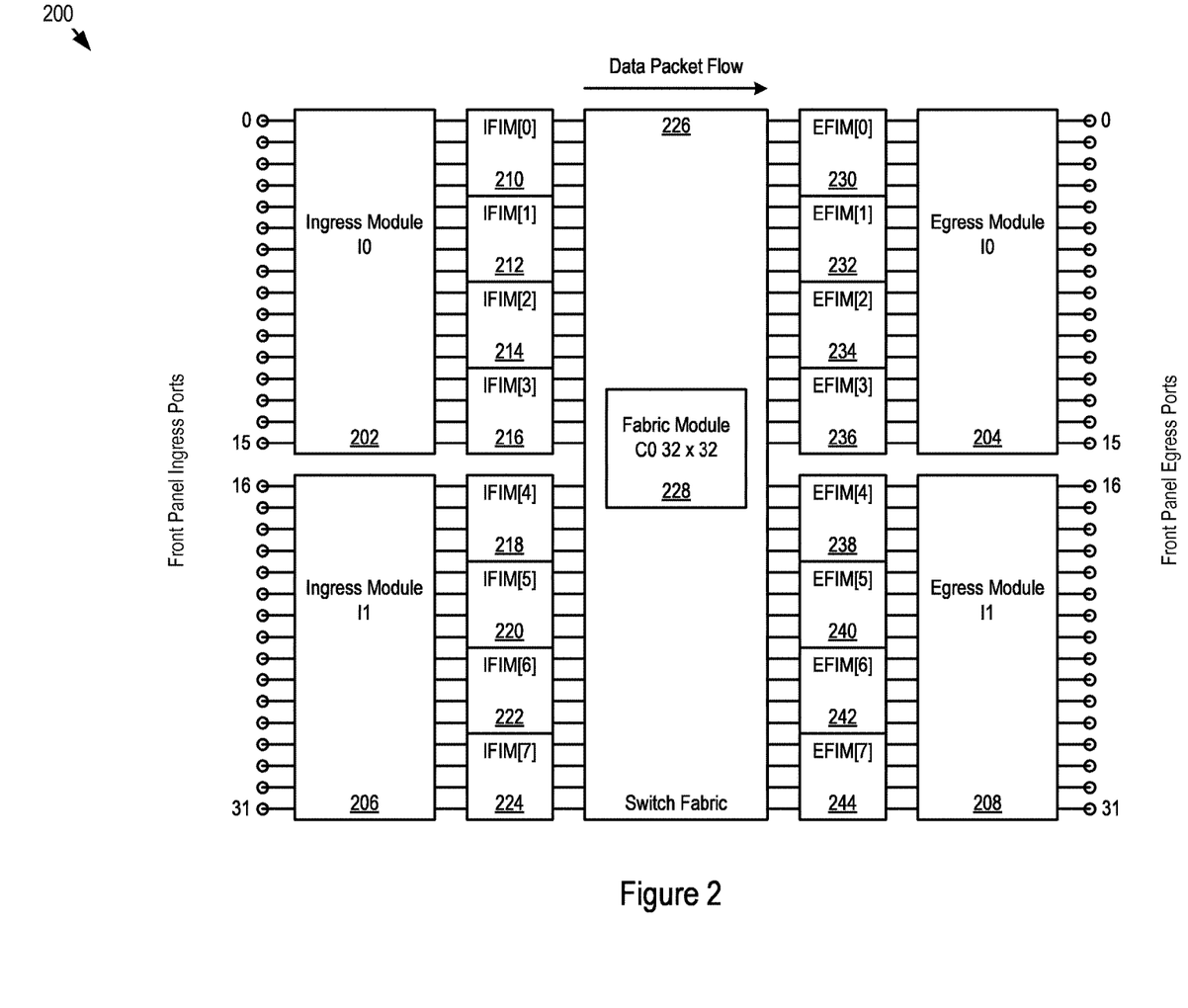
FIG. 2 shows an example switch architecture.

The ports and the links in the architecture are not limited to any particular line rate or speed. In the example of FIG. 2, the ports are 40 Gb ports, and the links between modules are, e.g., 42 Gb links. The 42 Gb links carry the port traffic as well as internal management traffic, including the LL and EE management traffic described below, and therefore may be configured to operate at a slightly faster rate than the ports themselves.

The separation of architecture components facilitates scalability through addition of the separate component blocks to achieve any desired target architecture. As another example, FIG. 2 shows an architecture 200 configured to handle 32 total ports. In the architecture 200, the ingress module 202 and egress module 204 serve ports 0-15 and the ingress module 206 and the egress module 208 serves ports 16-31. The ingress module 202 communicates incoming packets through the four IFIMs 210, 212, 214, and 216. Similarly, the ingress module 206 communicates incoming packets through the four IFIMs 218, 220, 222, and 224. The switch fabric 226 provides a 32×32 fully connect mesh via the fabric module 228. In the outgoing path, the EFIMs 230, 232, 234, and 236 direct packet flow to the egress module 204, while the EFIMs 238, 240, 242, and 244 direct packet flow to the egress module 208.

Each ingress module may have relatively light buffering, but may be configured for substantial input/output throughput. The ingress module may examine Ethernet address or IP address information in the incoming packet, check lookup tables, and determine through which output port the packet should go. The ingress module may also label the packet with fabric header so the switch fabric 106 can quickly switch the packet without having to dig back into the packet for any information. To that end, the fabric header may specify, for example, a particular output port and CoS for the packet.

The ingress modules communicate labeled packets to a connected IFIM for queuing in the VoQs. In turn the IFIMs push the packets through the switch fabric 106 as quickly as possible, and preferably without waiting for any authorization from the switch fabric 106 (or other logic) to do so. The switch fabric 106 routes the packet to a connected EFIM, and the EFIM communicates received packets to a connected egress module. The egress module determines the destination egress port for the packet, and sends the packet out of the egress port. The architecture routes packets across internal ports that are distinct from the front panel physical ports.

Figure 3:
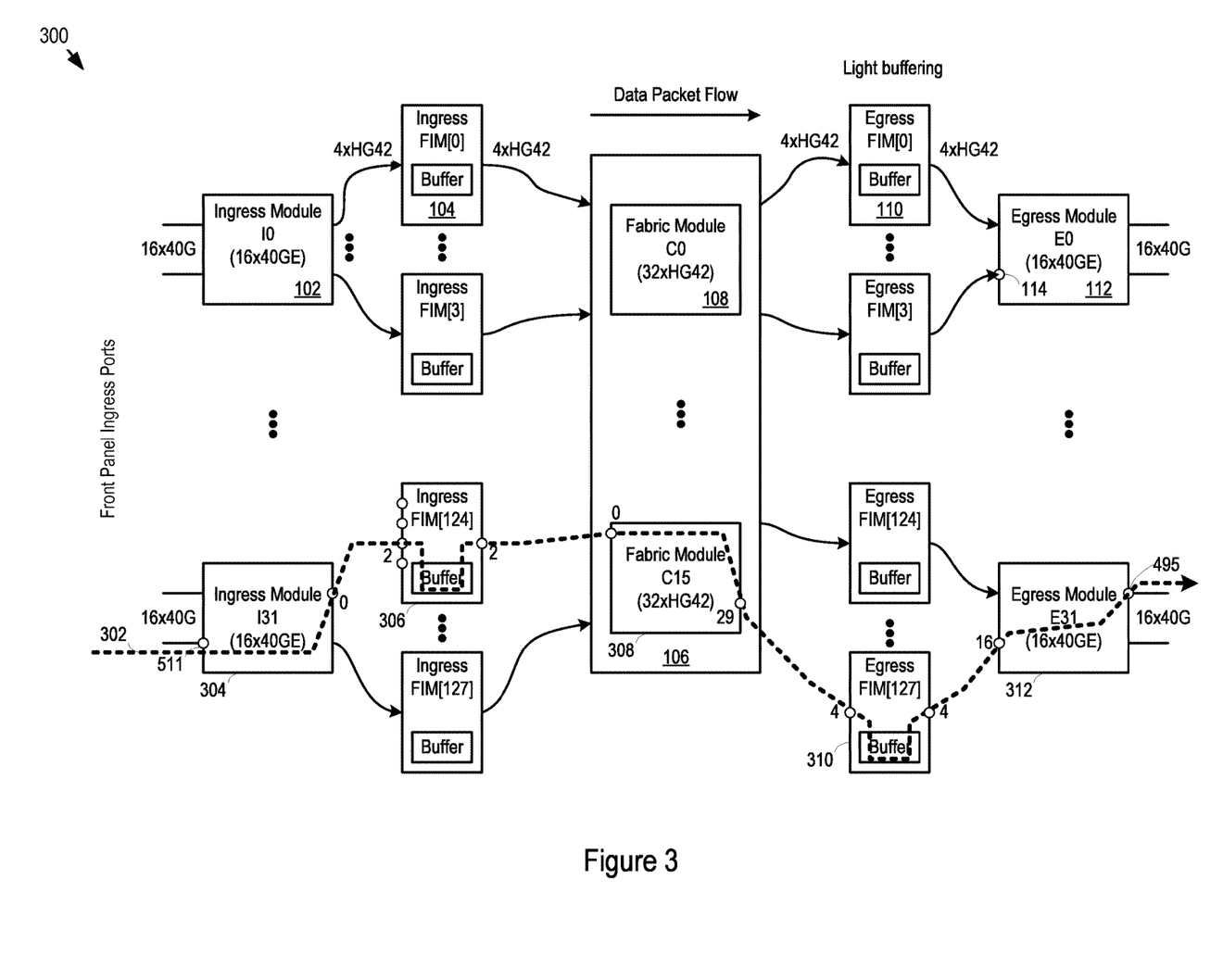
FIG. 3 shows an example of a packet flow through a switch architecture.

As examples of internal ports, consider the packet flow 302 in FIG. 3. The packet flow starts at the front panel port 511, and then traverses ingress module 304 output port 0 (of 16) to reach the IFIM 306 input port 2 (of 4). The IFIM 306 queues the packet in a VoQ in its buffers, and in the ordinary course of operation, pushes the packet out of the IFIM 306 output port 2 to reach, e.g., the fabric module 308 input port 0 (of 32). In this example, the fabric module 308 routes the packet out of the fabric module 308 output port 29, to the EFIM 310 input port 4 (of 4). The EFIM 310 buffers the packet, and in the ordinary course of operation, pushes the packet out of, e.g., EFIM 310 port 4 to the egress module 312 input port 16 (of 16). The egress module 312 transmits the packet out of egress port 495 in this example. The egress port 495 may be a physical front panel port.

One aspect of the architecture 100 is packet based switching. In other words, the architecture 100 need not incur latency penalties associates with segmenting packets into smaller cells, and later reassembling them before transmission out of the egress ports. Internal to the architecture 100, the architecture 100 may implement any desired protocol for directing packets to their destinations, performing management actions, and the like. In that regard, another aspect of the architecture is a flow management protocol that includes both LL and EE flow control between the internal ports and front panel ports in the architecture. The architecture may implement a push model in which the architecture components generally do not await permission to send packets. Instead, the architecture components proceed with propagating packets to the next link partner across internal ports, unless the flow management protocol signals for a particular component to stop doing so.

The architecture 100 may, in hardware, software, or both, implement the following component functionality:

| System Function and Component Link Selection | Example Implementation |
| --- | --- |
| Ingress Module Uplink Selection (to Ingress FIM) | When a packet arrives, the ingress module determines which output port (e.g., which of 16 output ports) to use to send the packet to an IFIM. The ingress module also adds a fabric tag to the packet that specifies the destination for the packet. The fabric tag may specify an egress port and CoS, as examples. The hash based load balancing helps to avoid packet reordering. The ingress module may perform a hash on a set of packet fields to produce a unique number. Modulo 16, the hash value results in a selection of output port from 0-15. One goal is to keep the load spread evenly across the links. The hash based approach helps to keep all of the packets in the same flow taking the same output port to the IFIM. As one example, the hash may be performed over one or more of the Media Access Control (MAC) Destination Address (DA), MAC Source Address (SA), Source IP Address (SIP), Destination IP Address (DIP), TCP port, or other fields in the received packet. The hash may look deeper into the packet as well, for example when the ingress module knows that there are particular additional packet fields that help define a flow. The ingress module may perform packet based routing, in which an entire packet is sent out the output port. In contrast, in cell based routing, the ingress module would instead divide the received packet into 16 cells and distribute them evenly across the 16 output ports. When the packet arrives, the ingress module selects a VoQ. There may be VoQs defined for multiple CoSs, e.g., 10 CoSs per egress port. The CoSs may include CoS (e.g., 2 CoSs) reserved for management control packets and CPU message |

| System Function and Component Link Selection | Example Implementation |
|---|---|
| | packets. The architecture 100 may switch the control packets at very high priority in relation to the other CoS. The ingress module may define in its own buffer space queues for each CoS. Each queue may be granted a minimum size guarantee, with the remaining buffer space governed by a sharing policy. |
| IFIMs Uplink Selection (to Fabric Module) | Incoming port statically mapped to uplink towards fabric module The IFIMs may implement static routing. For example, a packet received on a particular IFIM input port (e.g., input port 2) may leave on the same output port (e.g., output port 2). The static routing helps to avoid having one to many events occurring within the IFIM. |
| Fabric Module | Routing based on destination egress module. The fabric module routes the packet to an output port of the switch fabric that can reach the destination of the packet. The fabric module may make routing decisions based on the fabric tag that the ingress module added to the packet. |
| EFIMs Link Selection (to Egress Switch Module) | Incoming port statically mapped to link towards egress switch module. The EFIMs may implement static routing. For example, a packet received on a particular EFIM input port (e.g., input port 3) may leave on the same output port (e.g., output port 3). The static routing helps to avoid having one to many events occurring within the EFIM. |

The architecture 100 may, in hardware, software, or both, implement the following queuing functionality:

| Queuing | Example implementation |
|---|---|
| Ingress modules | The ingress modules may maintain 8 Class of Service (CoS) queues per egress port. Throughout the architecture there may be 8 CoS queues behind each port, with an additional 2 CoS queues for special traffic as noted above. |
| IFIM | Maintain queues per <egress port, CoS> for each output port of the IFIM. An IFIM may maintain a VoQ for every combination of destination port and CoS, for each output port of the IFIM. |
| Fabric Module | Maintain 8/10 CoS per egress port. A fabric module also supports all 8/10 CoS. |
| EFIM | Maintain a First in First Out (FIFO) buffer for each front panel egress port. The EFIM may pass through the packets it receives, acting like a FIFO in that regard. |
| Egress Module | Maintain 8/10 CoS queues per egress port. The egress module may implement a shared buffer to store arriving packets in CoS queues. |

The architecture 100 may, in hardware, software, or both, implement the following packet processing functionality:

| Packet Processing | Example implementation |
|---|---|
| Ingress Module | The ingress module performs packet processing and adds a fabric header. The ingress module determines the CoS by examining, e.g., protocol bits in the received packet, according to the protocol in question. |
| IFIM | The IFIM may select a VoQ for uplink control traffic on an outgoing link. |

The architecture 100 may, in hardware, software, or both, implement the following priority based flow control functionality:

| Priority-based Flow Control (PFC) | PFC messages may have a format consistent with IEEE 802.1Qbb. |
|---|---|
| Ingress module | The ingress module may receive the PFC messages and signal to the Memory Management Unit (MMU) to respond to the PFC messages. In one implementation, the response to the PFC message is to stop servicing specified CoS queue(s). In some implementations, the EFIM does not stop pushing packets to the egress module. In other words, the EFIM may continue to send packets to the egress module whenever there are packets queued at the EFIM. |
| Generate PFC | |
| IFIM | The IFIM may generate PFC messages to the ingress module based on source port buffer accounting (e.g., in response to congestion). |
| Ingress Module | The ingress module receives PFC messages and responds to PFC messages by stopping the service of the appropriate CoS queues. |

The PFC may employ PFC frames to signal congestion between link partners. For example, the network device that implements the architecture 100 is often connected to multiple link partners. A link partner may be, as just one example, a server consuming packets routed to the server by the network device. If the server cannot keep up with the rate at which packets are received, the server may issue a PFC frame back to the network device.

In the architecture 100, the ingress module receives the PFC frame and signals to the egress module handling the egress port connected to the server. In response, the egress module halts the CoS queue that was sending the packets to the server. Halting the CoS queue in the egress module may case the egress module CoS queue to begin to fill. The egress module recognizes the congestion, and sends its own flow control signal back through the EFIM, to the switching fabric 106. The switching fabric 106 may halt local queues that are feeding packets to the egress module. In turn, the switching fabric queues may begin to fill, and the switching fabric 106 may send a flow control signal back to the IFIM.

The IFIM responds by stopping the queues, e.g., on a per CoS and physical egress port basis, that may be sending packets ultimately to the egress module.

In general, the architecture 100 implements flow control at multiple layers to provide multiple domains of flow control. The multiple layers include the link level (LL) layer, and the end-to-end (EE) layer. The LL flow control happens quickly, and the EE control may happen more slowly than the LL flow control. The combined multi-layer flow control helps to ensure that there is no frame loss through the architecture 100. The multiple layers also help to detect and remedy congestion at the right granularity to avoid fabric blocking issues, and inform specific architecture components that may be able to facilitate a resolution to the congestion at that granularity.

Figure 4:
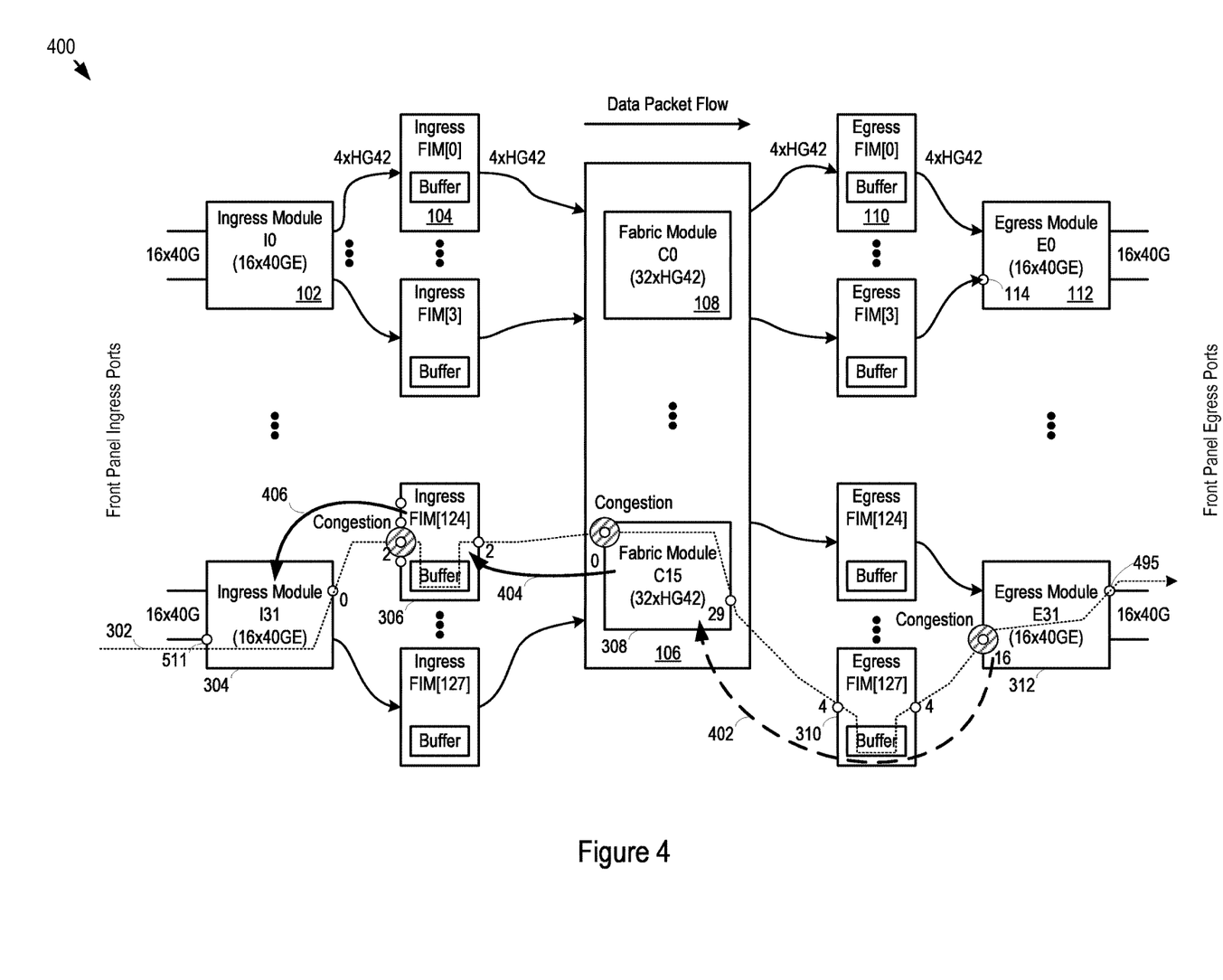
FIG. 4 shows an example of link level flow control.

FIG. 4 shows an example of link level flow control 400. During the discussion, reference is also made to FIG. 7, which is an example of logic 700 that a network architecture may implement in hardware or software to provide link level flow control. The LL flow control is service aware, and helps to ensure that there is no packet loss during the time that EE flow control takes effect.

Figure 7:
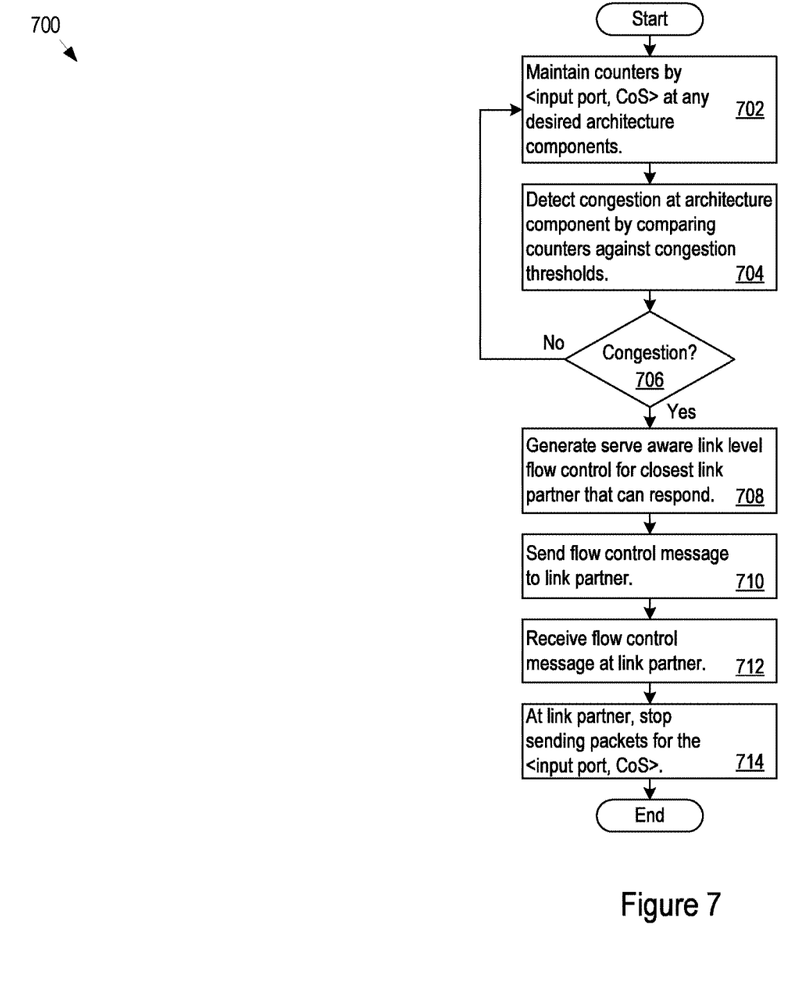
FIG. 7 is an example of logic that a network architecture may implement for link level flow control.

Assume, e.g., that the egress module 312 input port 16 is experiencing congestion. The egress module 312 may detect the congestion by, e.g., maintaining counters that increment when a packet arrives, and decrement when a packet is transmitted out the physical egress port (702). The counters may be setup on a <egress module input port, CoS> basis, and thus for every input port to the egress module 312, and for every CoS, there is a counter that increments when a packet of that CoS arrives on that input port, and decrements when a packet for that ingress port and CoS goes out through a physical egress port. When the counter hits a configurable limit (704), the egress module may determine that there is congestion (706), and take a LL flow control action. The action may include generating (708) and sending a LL flow control message 402 back to the link partner (710), e.g., through the connected EFIM to a fabric module. When congestion is detected (based on counter values or in other ways) for a particular input port and CoS at a particular architecture component, that architecture component may respond with LL flow control with a link partner.

The LL flow control message 402 may be a protocol frame that includes bits specifically assigned to certain CoSs. In other words, the LL flow control is service aware. For example, the protocol frame may include 8-16 bits, each assigned to a CoS. In the protocol frame, a bit may be set to 1 to indicate congestion for the CoS, and set to 0 to indicate no congestion for that CoS.

The protocol frame may also specify a timer value that the recipient of the protocol frame uses to time out the LL flow control. The timer provides an error management mechanism that guards against failure to receive a subsequent protocol frame that clears the congestion bit for the CoS. In other words, when the timer expires, the link partner may resume sending packets for the CoS and input port previously flagged as congested.

The LL flow control message 402 passes through the EFIM 310, which forwards it immediately to the fabric module 308, where it is received (712). In scenarios where the congestion quickly alleviates itself, then the egress module 312 may send another LL flow control message 402 clearing the congestion bit. However, in the meantime, the fabric module 308 reacts to the LL flow control message 402.

In particular, the link partner, the fabric module 308, stops sending packets to the egress module 312 for the congested <egress module input port, CoS> (714). Note that the fabric module 308 may also maintain buffer use counters on a <fabric module input port, CoS> basis as described above with regard to the egress modules. If the congestion does not persist, the egress module 312 may clear the congestion bit for the <egress module input port, CoS>. In response, the fabric module 308 restarts packet delivery. The queues in the fabric module 308 will start to drain, and may not hit the threshold level that signifies congestion.

However, any buffer use counter per <fabric module input port, CoS> in the fabric module 308 may reach or exceed a configurable congestion depth threshold. When the threshold is reached, the fabric module 308 may also respond to its own congestion with a LL flow control message 404 to the IFIM (e.g., the IFIM 306) that is sending packet traffic for that <fabric module input port, CoS>. Congestion in the fabric module 308 may occur because the flow control message 402 has instructed the fabric module 308 to stop sending packets, which then begin to fill the queues in the fabric module 308.

The IFIM 306 receives the LL flow control message 404 from the fabric module 308. Recall that the LL flow control message 404 was responsive to <fabric module input port, CoS> congestion. Note that the IFIM 306 organizes VoQs on the basis of <physical egress port, CoS>. The IFIM 306 typically has many queues for the same class of service, e.g., one for each egress port. The IFIM 306 therefore halts all of its VoQs for the given CoS, because the IFIM 306 does not necessarily know which VoQs are generating the traffic that is congested on particular input ports to the fabric module 308 or egress module 312. Accordingly, the IFIM 306 does not stop a particular VoQ for a specific <egress port, CoS>. Instead, the IFIM 306 stops all the VoQs of the specified CoS.

Note also that the IFIM may also maintain <IFIM input port, CoS> counters. Accordingly, the IFIM 306 may send a service aware flow control message 406 back to the ingress module 304, when a counter exceeds a predetermined congestion threshold. In turn, the ingress module 304 also maintains queue counters. Accordingly, if an ingress module 304 queue counter exceeds a predetermine congestion threshold, then the ingress module 304 may send a flow control message to its link partner, which may be an independent network device, server, or other connected device. Each of the congestion thresholds may differ for each architecture component. Note that each architecture component may respond very quickly to local congestion by sending a flow control message to its nearest link partner that is able to take action in response. The fast acting LL flow control helps to ensure that packets are not dropped, and acts while the end-to-end flow control is starting up.

Figure 5:
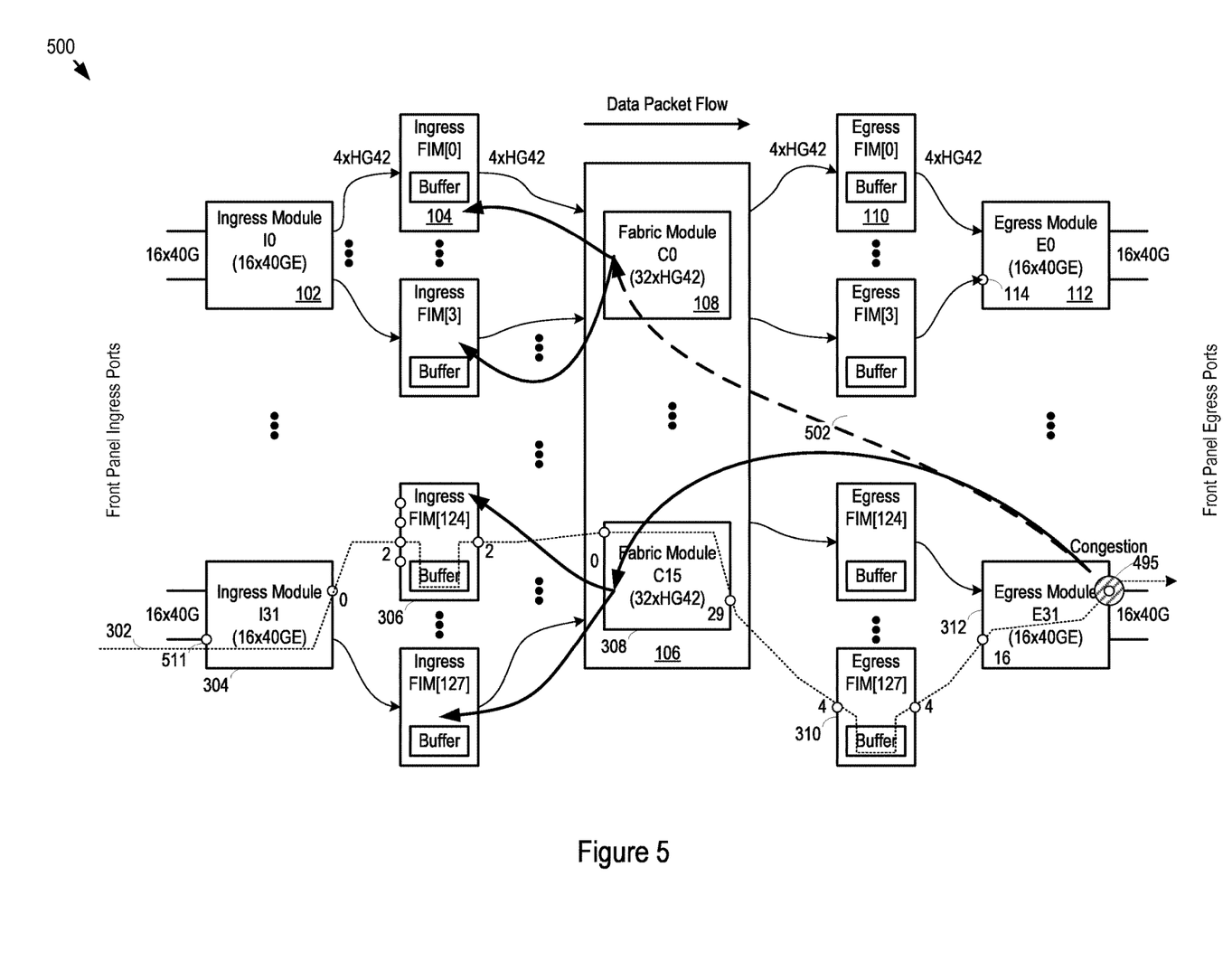
FIG. 5 shows an example of end-to-end flow control.

FIG. 5 shows an example of end-to-end (EE) flow control 500. During the discussion, reference is also made to FIG. 8, which is an example of logic 800 that a network architecture may implement in hardware or software to provide end-to-end flow control. The EE flow control may operate at the granularity of <physical egress port, CoS>. Note that the signaling for EE flow control happens between, e.g., the egress module and the IFIM. Thus, there exists some amount of signaling latency for EE flow control to take effect because the EE flow control message may need to make several hops to reach the IFIM. The LL flow control acts in the meantime to avoid packet loss.

In the example of FIG. 5, the egress port 495 experiences congestion at one or more CoS levels. The CoS queue depth for a given egress port, e.g., the egress port 495, begins to rise, and one or more of the queues eventually exceeds a configurable congestion threshold. At that point the egress module 312 sends an EE flow control message 502 back to the IFIMs, specifying congestion on a <physical egress port, CoS> basis. The EE flow control message 502 directs the IFIMs to stop sending packets on the link for the specified CoS. The IFIMs respond by stopping transmission of packets from the CoS queue assigned to the physical egress port that is congested (e.g., egress port 495 in this example). As shown in FIG. 5, the EE flow control message 502 is passed to all the IFIMs, because each one has a <physical egress port, CoS> queue that may be contributing to the congestion. The EE flow control message 502 passes back to the IFIMs through one or more of the EFIMs and fabric modules.

The EE flow control message 502 is end-to-end in the sense that it traverses multiple link partners to reach an entity that can take action. In another sense, the EE flow control message 502 flows from the output side of the architecture 100 (e.g., from egress flow components, or architecture components following the switch fabric 106) to the input side of the architecture 100 (e.g., to ingress flow components, or architecture components prior to the switch fabric 106). In doing so, the EE flow control message 502 may pass through other architecture components (e.g., the fabric module 308) that also could stop or start queues, and perhaps have some impact on congestion at the physical egress port.

In this example, the EE flow control message 502 passes through the EFIM 301 and the fabric module 308 to reach the IFIM 306. Note that the EE flow control message 502 specifies a <physical egress port, CoS> and therefore matches the granularity of the VoQs in the IFIM 306, which are also organized by <physical egress port, CoS>. The EE flow control message 502 may act on a slower time frame than the LL flow control messages, in part due to the traversal of the EE flow control message 502 through multiple architecture components to reach an architecture component that will act. Despite the longer latency of the EE flow control, no packets are lost because LL flow control happens much more quickly. The LL flow control gives the EE flow control time to react.

Figure 8:
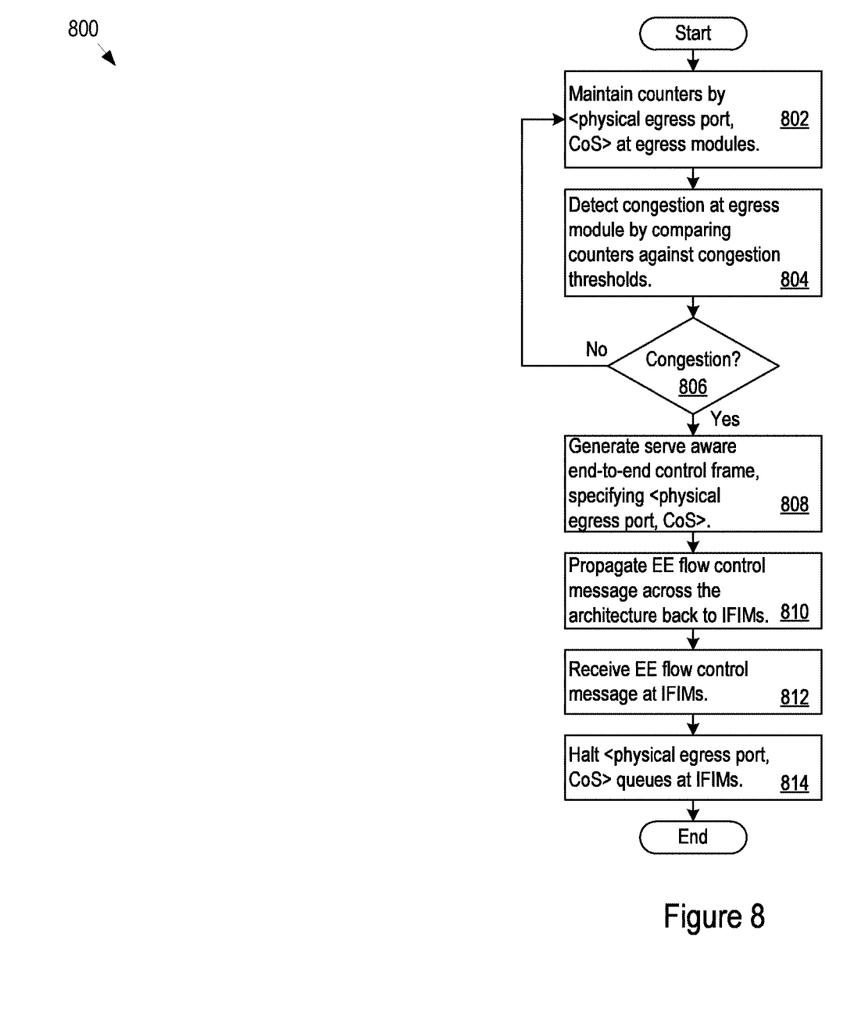
FIG. 8 is an example of logic that a network architecture may implement for end-to-end flow control.

Expressed another way, the architecture 100 detects how backed up a queue is, on a <physical egress port, CoS> basis, e.g., by maintaining counters and comparing against congestion thresholds (802, 804). This analysis may proceed based on the number of buffer units currently in use, where the egress modules may separate packets into chunks that are stored in the buffer units in preparation for transmitting the packet. When the number of buffer units in use exceeds a configurable congestion threshold, then the egress module may determine that congestion exists for the applicable <physical egress port, CoS> (806).

When the egress module 312 detects congestion, the egress module 312 generates an EE flow control frame (808) specifying the <physical egress port, CoS>. The egress module 312 sends the EE flow control frame in-band back through the architecture 100, through the switching fabric 106 (810). The EE flow control frame (and LL flow control frames) may be assigned a high CoS (e.g., level 9 or 10) so that the architecture components react to the flow control frames in an accelerated manner, e.g., prior to handling packets assigned lower CoSs (e.g., levels 1-8).

The EE flow control frame is multicast in the sense that it reaches all of the IFIMs. For example, when any fabric module receives an EE flow control message from any EFIM, the fabric module may multicast the EE flow control message through all of the fabric modules to every IFIM. Each IFIM in the architecture 100 maintains a queue for every CoS for every egress port. As a result, when the <physical egress port, CoS> becomes congested, any IFIM might be contributing packets to that congestion. Accordingly, when the IFIMs receive the EE flow control message (812), each IFIM stops its <physical egress port, CoS> queue (814).

EE flow control helps to avoid HoL blocking by providing flow control at the right granularity. In particular, when EE flow control takes effect (e.g., shortly after LL flow control, if LL flow control does not resolve the congestion) the EE flow control stops queues at the specific CoS and egress port where congestion is present. In contrast to LL flow control which may stop all CoS queues sending traffic to a specific architecture component input port, the EE flow control allows other CoS packets to continue to their destinations.

Figure 6:
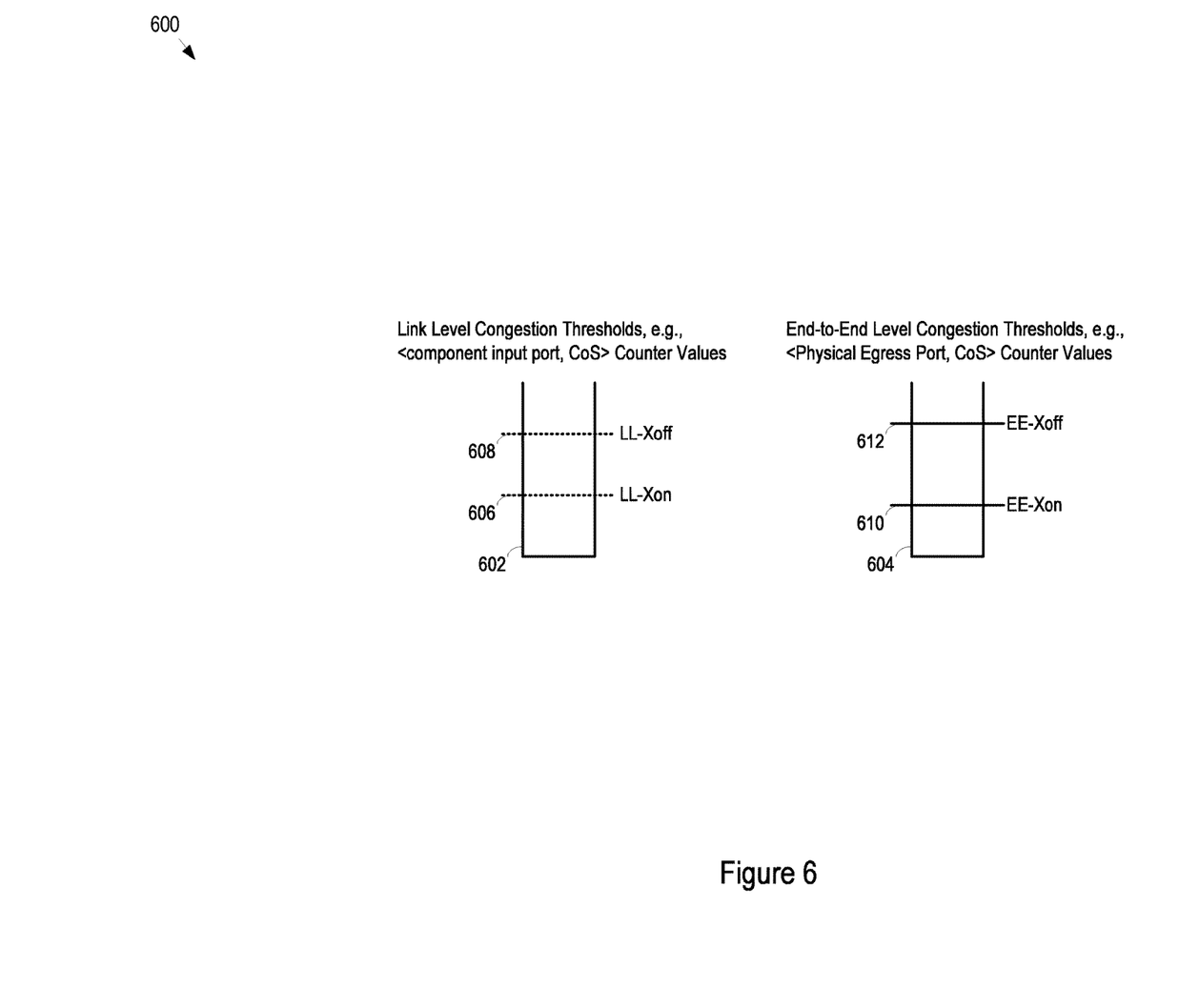
FIG. 6 shows an example of relative threshold tuning.

FIG. 6 shows an example of relative threshold tuning 600. In particular, LL flow control operates on the basis of congestion in link level queues 602, which may be organized by <network component input port, CoS>. EE flow control operates on the basis of congestion in EE queues 604, which may be organized by <physical egress port, CoS>.

Two example LL thresholds are shown: the LL-Xon threshold 606 and the LL-Xoff threshold 608. These thresholds may vary between different LL queues, or they may all be set at the same level. When the LL queue 602 reaches the LL-Xoff threshold 608, the architecture component may issue a LL flow control message to its link partner to halt the accumulation of packets in the LL queue 602. Similarly, when the LL queue 602 empties to the LL-Xon threshold 606, the architecture component may issue a LL flow control message to its link partner to ask the link partner to resume sending packets for the particular <input port, CoS> at issue.

The LL thresholds LL-Xoff 608 and LL-Xon 606, and the LL queue sizes may be chosen by modeling and experiment to achieve any desired goals. For example, the thresholds and queue sizes may be selected to primarily avoid dropped packets. In addition, the thresholds and queue sizes may be selected to minimize LL flow control events, to avoid dropped packets, and to avoid underutilization of links between components. Thus, for example, the LL-Xoff threshold 608 is set relatively high to avoid flow control events, but still low enough to avoid packet loss given the LL flow control latency.

Two example EE thresholds are shown: the EE-Xon threshold 610 and the EE-Xoff threshold 612. These thresholds may vary between different EE queues, or they may all be set at the same level. When the EE queue 604 reaches the EE-Xoff threshold 612, the egress module may issue an EE flow control message specifying <physical egress port, CoS> to the IFIMs in order to halt the accumulation of packets in the EE queue 604. Similarly, when the EE queue 604 empties to the EE-Xon threshold 610, the egress module may issue an EE flow control message to the IFIMs to note that the IFIMs may begin again to send packets for the specified <physical egress port, CoS>.

The EE thresholds LL-Xoff 612 and EE-Xon 610, and the EE queue sizes may be chosen by modeling and experiment to achieve any desired goals. For example, the thresholds and queue sizes may be selected to minimize buffer usage, and avoid link underutilization.

The determination of the thresholds may involve an analysis of how long can the architecture keep the link busy until there are no more packets that can be sent. The thresholds may therefore be a function of flow control latency. For example, how long does it take the architecture to restart packet queues, once congestion falls below the threshold levels. As a general guideline, the latency to restart may be approximately one MTU or less. Furthermore, the relative distance between on and off thresholds may be set to avoid frequently repeating flow control on and flow control off messages. In one implementation, the distance between the Xon and Xoff thresholds is one MTU or more.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, it will be apparent to those of ordinary skill in the art that many other variations of embodiments and implementations are possible. As one example, the flow control from the fabric back to the ingress modules may be done with respect to <fabric egress port, CoS>. In this alternative, the flow control may cause a subset of VoQs specific to the specified fabric egress port and CoS to stop sending packets. This alternative to VoQ flow control is finer grained than the link level (LL) flow control described above, but somewhat coarser than the end-to-end (EE) flow control described above.

What is claimed is:

1. A device, comprising:
    packet flow architecture components comprising:
        a plurality of ingress fabric interfaces;
        a switching fabric in communication with the plurality of ingress fabric interfaces;
        a plurality of egress fabric interfaces in communication with the switching fabric;
        an egress module in communication with the plurality of egress fabric interfaces; and
    flow control circuitry configured to:
        communicate a link level (LL) flow control message from an originating architecture component to a link partner among the packet flow architecture components, the LL flow control message being separate from data packets communicated by the device and the LL flow control message including a protocol frame that includes bits indicating congestion for each class of service (CoS); and
        after communicating the LL flow control message, remove blocking resulting from the LL flow control message by transmitting an end-to-end (EE) flow control message from the egress module to the switching fabric and then the switching fabric multicasting the EE flow control message to the plurality of ingress fabric interfaces, wherein
    each of the ingress fabric interfaces is a separate component from each of the egress fabric interfaces,
    input data flows from an external source, through an ingress port, to an ingress fabric interface and then to the switching fabric,
    output data flows from the switching fabric to an egress fabric interface and then, through an egress port, to an external destination,
    the EE flow control message is transmitted directly from the egress module to the switching fabric without passing through any of the plurality of egress fabric interfaces,
    the EE flow control message specifies a particular CoS and physical egress port, and
    the blocking comprises head of line blocking.

2. The device of claim 1, wherein
    each ingress fabric interface comprises a first packet queue organized by physical egress port and CoS, and
    the originating architecture component is configured to respond to an input port and CoS counter by communicating the LL flow control message.

3. The device of claim 1, wherein the LL flow control message comprises a specifier of a congested input port within the originating architecture component.

4. The device of claim 1, wherein the LL flow control message comprises a specifier of both a congested input port and CoS within the originating architecture component.

5. The device of claim 1, wherein the EE flow control message comprises a specifier of a congested queue for the physical egress port handled by the egress module.

6. The device of claim 1, wherein the EE flow control message comprises a specifier of a congested queue by the particular CoS and the physical egress port handled by the egress module.

7. The device of claim 1, wherein the LL flow control message, the EE flow control message, or both comprise a queue stop message.

8. The device of claim 1, wherein the LL flow control message, the EE flow control message, or both comprise a queue restart message.

9. The device of claim 1, wherein the LL flow control message and the EE flow control message specify congestion at different levels of granularity.

10. The device of claim 1, wherein the flow control is operable to perform EE flow control and LL flow control together to avoid packet loss.

11. The device of claim 1, wherein the link partner comprises a physically adjacent architecture component with respect to the originating architecture component.

12. The device of claim 1, wherein the LL flow control message is configured to pass through the egress fabric interface to the link partner.

13. The device of claim 1, wherein
first data packets received by the device are received via at least one ingress fabric interface, and
second data packets transmitted by the device are transmitted via at least one egress fabric interface.

14. A device, comprising:
a modularized packet routing architecture comprising:
ingress modules assigned to ingress fabric interfaces;
egress modules assigned to egress fabric interfaces;
a fabric interface between the ingress fabric interfaces and the egress fabric interfaces;
link level (LL) flow control circuitry executing contemporaneously with end-to-end (EE) flow control circuitry; and
the EE flow control circuitry, wherein
each of the ingress fabric interfaces is a separate component from each of the egress fabric interfaces,
input data flows from an external source, through an ingress port, to an ingress module, then to a corresponding ingress fabric interface and then to the switching fabric,
output data flows from the switching fabric to an egress fabric interface, then to a corresponding egress module and then, through an egress port, to an external destination,
the LL flow control circuitry is configured to execute LL flow control on input ports of link partners in the modularized packet routing architecture via LL flow control messaging that is separate from data packets communicated by the device, the LL flow control messaging including a protocol frame that includes bits indicating congestion for each class of service (CoS),
the EE flow control circuitry is configured to alleviate blocking resulting from the LL flow control by transmitting EE flow control messages, from the egress modules to the fabric interface and then the fabric interface multicasting the EE flow control messages to the ingress modules,
the EE flow control messages are transmitted directly from the egress modules to the fabric interface without passing through any of the plurality of egress fabric interfaces, and
the EE flow control messages each specify a CoS and corresponding physical egress port.

15. The device of claim 14, wherein
the EE flow control circuitry is configured to transmit the EE flow control messages across multiple link partners by communicating the EE flow control messages from an egress module among the egress modules to an ingress fabric interface among the ingress fabric interfaces, and
the LL flow control circuitry is configured to issue LL flow control messages to link partners by communicating the LL flow control messages from an originating architecture component in the modularized packet routing architecture to an immediately preceding architecture component that is configured to perform queue stops and queue re-starts responsive to the LL flow control messages.

16. A method comprising:
in a network device:
communicating a link level (LL) flow control message between modularized link partners in a packet flow architecture in the network device, the LL flow control message being separate from data packets communicated by the device and the LL flow control message including a protocol frame that includes bits indicating congestion for each class of service (CoS); and
after sending the LL flow control message, alleviating blocking resulting from the LL flow control message by transmitting an end-to-end (EE) flow control message across the packet flow architecture from an egress module to a switching fabric and then the switching fabric multicasting the EE flow control message to a plurality of ingress fabric interfaces, wherein
each of the ingress fabric interfaces is a separate component from each of the egress fabric interfaces,
input data flows from an external source, through an ingress port, to an ingress fabric interface and then to the switching fabric,
output data flows from the switching fabric to an egress fabric interface and then, through an egress port, to an external destination,
the EE flow control message is transmitted directly from the egress module to the switching fabric without passing through any of a plurality of egress fabric interfaces, and
the communicating of the LL flow control message comprises executing LL flow control on input ports of the modularized link partners in the packet flow architecture.

17. The method of claim 16, wherein executing LL flow control comprises:
executing LL flow control between physically connected link partners in the packet flow architecture.

18. The method of claim 16, wherein effects of the LL flow control message precede effects of the EE flow control messages.

* * * * *